2,874,057

CEMENTIFEROUS PAINTS

John Edwin Oakley Mayne, Cambridge, England, assignor to The British Iron and Steel Research Association, London, England, a British company No Drawing. Application January 6, 1954
Serial No. 402,591

Claims priority, application Great Britain November 11, 1949

11 Claims. (Cl. 106—14)

This invention relates to cementiferous paints and is particularly concerned with cementiferous paints adapted for the protection of metal surfaces, particularly iron and steel surfaces, against corrosion and corrosion fatigue, the present application being a continuation-in-part of my earlier (abandoned) application, Serial No. 192,377, filed October 26, 1950.

One object of the invention is to provide a cementiferous paint which is itself stable in the presence of water.

Another object of the invention is to provide a cementiferous paint which can be applied to iron or steel surfaces to produce thereon a firmly adherent coating containing sufficient metallic zinc to afford cathodic protection to the iron or steel.

Another object of the invention is to provide a cementiferous paint which, although setting rapidly after application to a surface, will have a satisfactorily long pot life.

A more specific object of the invention is to provide a rapid setting, cementiferous paint, having a satisfactorily long pot life, which consists essentially of an aqueous solution of an alkali metal phosphate and such a quantity of metallic zinc dust that upon application of a film of the paint to a surface the alkali metal phosphate will react with a part only of the zinc to form a zinc phosphate cement, the remainder of the zinc constituting a cathodic protecting layer, firmly bound to the surface by the zinc phosphate cement.

Various examples of compositions of paint in accordance with the invention will now be given:

Example I

Zinc dust free from lumps and containing about 4% of zinc oxide, which is always present in zinc dust, is mixed with a 20% aqueous solution of dipotassium hydrogen phosphate (pH 8.5) in the following proportions:

Zinc dust (containing zinc oxide) _____ gms__ 54
Phosphate solution _____ ccs__ 10

The density of 20% solution of $K_2HPO_4$ at normal temperatures is 1.2 gms./cc. so that 10 ccs. of the solution contain 2.4 gms. of solid phosphate. Thus the ratio of zinc dust to solid phosphate in the mix is 22.5 to 1.

Such a mixture forms a paint suitable for use on clean metal surfaces, such as steel. However for satisfactory adhesion to rusty surfaces it is desirable to use a stronger phophate solution of up to 30%, 10 ccs. of which contain 3.6 gms. of solid phosphate, so that in this case the ratio zinc dust/solid phosphate is 15:1. The need for a stronger solution is thought to be due to the fact that the rust absorbs some of the solution and thereby reduces the quantity of the phosphate available for reaction with the zinc dust.

Example II

In this composition the dipotassium hydrogen phosphate solution of Example I is replaced by a 25% aqueous solution of tripotassium phosphate, the proportions of zinc dust and phosphate solution being the same. For use on rusty surfaces a stronger solution up to 35% is necessary, the ratio of zinc dust to solid phosphate being approximately 12.9:1 (since 10 ccs. of this stronger solution contains about 4.2 gms. of phosphate). The solution has a pH value in the region of 9.9.

Example III

In this composition the phosphate solution is a mixed solution of saturated potassium dihydrogen phosphate and a 30% aqueous solution of dipotassium hydrogen phosphate, the pH value being 8 or slightly more than 8. The proportions of zinc dust and phosphate solution are as in the previous examples.

The present invention also contemplates the use of sodium phosphates but the potassium phosphates used in the above compositions cannot in practice be wholly replaced by the corresponding sodium salts as the solubility of the latter at normal temperatures is too low to ensure satisfactory cement formation.

Four compositions utilising mixtures of sodium and potassium phosphates are as follows:

Example IV

The phosphate in the solution of Example I is replaced by a mixture of disodium hydrogen phosphate and dipotassium hydrogen phosphate in the proportion 5 gms. to 18 gms. respectively, this ratio giving a pH value of about 8.5.

Example V

The phosphate in the solution of Example I is replaced by a mixture of sodium dihydrogen phosphate and tripotassium phosphate in the proportion 9 gms. to 15 gms. respectively this ratio giving a pH value of about 8.5.

Example VI

The phosphate in the solution of Example I is replaced by a mixture of trisodium phosphate and potassium dihydrogen phosphate in the proportion 8 gms. to 6 gms. respectively, this ratio again giving a pH value of about 8.5.

Example VII

The phosphate in the solution of Example I is replaced by a mixture of trisodium phosphate and tripotassium phasphate in any possible proportion (the amount of the sodium salt present being limited by its solubility). The resulting solution has a pH value of about 9.9.

In all the above examples, the pH of the solution is not less than eight, and in most instances is 8.5 or even higher. This is an important feature of the invention since more acid solutions cause the mixture to set too rapidly for its use as a paint to be practicable.

The solutions preferably contain from about 2.4 grams to about 4.2 grams of phosphate per each 10 ccs., and the phosphate concentration of the solutions is from about 20 to about 35%.

The proportion of zinc dust to solid phosphate is not of course affected by dilution with water. In practice the amount of water added to the solution will depend on the method by which the paint is to be applied; thus, 50 to 60 parts by weight of zinc to 10 parts by volume of solution (as in all the above examples) is about the optimum ratio for brushing. If, on the other hand, the paint is to be applied by spraying or dipping, more water should be added.

It will be clearly understood that other ingredients normally present in paint, such as pigments and wetting agents, may be included in the compositions described in the examples. Moreover substances may be incorporated which are selected in order to discourage the growth of micro-organisms on surfaces treated. Such substances are, for example, compounds of copper, mercury or arsenic or organic compounds.

The new paints are easy and cheap to manufacture, since the ingredients only require mixing, provided that the zinc dust is free from lumps. They remain brushable for a considerable time after mixing and have been stored in covered containers at room temperature for periods of more than three days. If made up with too strong a phosphate solution, or stored for too long at too high a temperature, they become difficult to apply, although this effect of storage can be overcome by the addition of water.

In practice, however, it is thought preferable always to use freshly mixed paint.

When any of the paints of the above examples is well brushed out on clean or rusty steel surfaces the weight of the dried film obtained is from 0.4 to 0.8 ounce per square foot, equivalent to a coverage of 20 to 40 square feet per pound. Satisfactory coatings as thick as 1.6 ounces per square foot can be obtained by liberal application of the paint.

The paints set within an hour of application and their setting is not appreciably affected by the relative humidity of the atmosphere. They can therefore be applied in windy situations and in very high humidities such as those which prevail in a dry dock.

While the invention is not limited by any particular theory as to the mode of action of the new cementiferous paints, it appears likely that the potassium phosphate solution first reacts with the zinc oxide which is always present in zinc dust, with the formation of zinc phosphate, potassium hydroxide and water. This reaction can only proceed for a short time owing to the limited supply of zinc oxide; it is therefore probably succeeded by a reaction between the zinc dust and potassium phosphate, which forms $Zn_3(PO_4)_2 \cdot 4H_2O$ or $3[Zn_3(PO_4)_2 \cdot Zn(OH)_2]$, potassium hydroxide and hydrogen.

If the setting reaction is assumed to be:

$$3Zn + 2K_3PO_4 + 10H_2O \rightarrow Zn_3(PO_4)_2 \cdot 4H_2O + 6KOH + 3H_2$$

then for cement formation it will be seen that 65 gms. zinc react with 141 gms. phosphate. From these figures, the use in the mix of equal quantities of zinc dust and phosphate will certainly leave some excess of zinc for the cathodic protection of the steel; in practice, however the weight of zinc to dust used is more than eleven times the weight of the phosphate. In any event the zinc phosphate ratio should not exceed 25 in the case of dipotassium phosphate, and 20 in the case of the tribasic salt.

The reaction set out above is slow when the paint is stored in bulk, probably due to the fact that the hydrogen is not readily removed from the surface of the zinc; when, however, the paint is spread out in a thin film, the zinc is depolarised by atmospheric oxygen and rapid setting of the paint ensues. Secondary reactions may take place between the zinc dust and the potassium hydroxide with the formation of complex zincates.

The dried films of phosphate paints are alkaline to phenolphthalein paper, but this alkalinity does not affect the drying of linseed oil applied over the paint film. The paints in accordance with the invention are water stable and are suitable for use as priming coats for the protection of metal against immersion in sea-water. Other possible applications of the new paints are their use as a wash on pickled steel to prevent the formation of rust before paint is applied and their use for the prevention of stress corrosion in aluminum alloys.

I claim:

1. A cementiferous paint for the protection of ferrous metal surfaces consisting essentially of a mixture of zinc dust and an aqueous solution containing at least about 20% of an alkali metal phosphate of the group consisting of, monopotassium dihydrogen phosphate, dipotassium hydrogen phosphate, tripotassium phosphate, a mixture of potassium phosphates, and a mixture of a potassium phosphate and a sodium phosphate, said aqueous solution having a pH value within the range from about 8 to about 9.9 and the weight ratio of zinc dust to said alkali metal phosphate being within the range from 1:1 to 25:1.

2. A cementiferous paint composition as defined in claim 1 in which the pH value of the phosphate solution is about 8.5.

3. A cementiferous paint composition as defined in claim 1 in which the aqueous phosphate solution contains between 2.4 gms. and 4.2 gms. of phosphate in each 10 cc. of solution.

4. A cementiferous paint composition as defined in claim 1 in which the concentration of the aqueous phosphate solution is within the range from 20% to 35% by weight.

5. A cementiferous paint composition as defined in claim 1 in which the phosphate consists of dipotassium hydrogen phosphate.

6. A cementiferous paint composition as defined in claim 1 in which the phosphate consists of tri-potassium phosphate.

7. A cementiferous paint composition as defined in claim 1 in which the phosphate consists of a mixture of potassium dihydrogen phosphate and dipotassium hydrogen phosphate.

8. A cementiferous paint composition as defined in claim 1 in which the phosphate consists of a mixture of disodium hydrogen phosphate and dipotassium hydrogen phosphate.

9. A cementiferous paint composition as defined in claim 1 in which the phosphate consists of a mixture of sodium dihydrogen phosphate and tri-potassium phosphate.

10. A cementiferous paint for the protection of metal surfaces consisting essentially of an admixture of zinc dust containing about 4% of zinc oxide with an aqueous solution containing at least 20% of dipotassium hydrogen phosphate, said solution having a pH of about 8.5, and the weight of the zinc dust being at least equal to and not more than 25 times as great as the weight of phosphate contained in said solution, the zinc dust and the dipotassium hydrogen phosphate constituting at least the major solid ingredients of the paint.

11. A cementiferous paint for the protection of metal surfaces consisting essentially of an admixture of zinc dust containing about 4% of zinc oxide with an aqueous solution containing at least 20% of tri-potassium phosphate, said solution having a pH of about 9.9 and the weight of the zinc dust being at least equal to and not more than 20 times as great as the weight of phosphate contained in said solution, the zinc dust and the tri-potassium phosphate constituting at least the major solid ingredients of the paint.

References Cited in the file of this patent

UNITED STATES PATENTS

| 1,007,069 | Coslett | Oct. 31, 1911 |
| 1,359,137 | Wile | Nov. 16, 1920 |
| 2,137,370 | Unger | Nov. 22, 1938 |
| 2,328,540 | Hochwalt | Sept. 7, 1943 |
| 2,332,209 | Enquist | Oct. 19, 1943 |
| 2,357,269 | Russell et al. | Aug. 29, 1944 |
| 2,471,907 | Snyder | May 31, 1949 |
| 2,540,108 | Fisher | Feb. 6, 1951 |
| 2,568,424 | Watson | Sept. 18, 1951 |
| 2,702,768 | Hyams et al. | July 22, 1955 |

FOREIGN PATENTS

| 705,365 | Great Britain | Mar. 10, 1954 |
| 588,127 | Great Britain | May 14, 1947 |